United States Patent [19]

Markel

[11] Patent Number: 5,656,772

[45] Date of Patent: Aug. 12, 1997

[54] GAS PRESSURE GAUGE CLAMP

[76] Inventor: Philip A. Markel, 6800 Woodlake Dr. NE., #202, Palm Bay, Fla. 32905

[21] Appl. No.: 684,168

[22] Filed: Jul. 19, 1996

[51] Int. Cl.$^6$ ............................................... B60C 23/04
[52] U.S. Cl. ............................................ 73/146.8; 116/34 R
[58] Field of Search ........................... 73/146.8; 116/34 R

[56] References Cited

U.S. PATENT DOCUMENTS

| | | | |
|---|---|---|---|
| 351,229 | 10/1886 | Walter . | |
| 1,548,470 | 8/1925 | Kennedy | 116/34 R |
| 3,429,185 | 2/1969 | Piper et al. | 73/420 |
| 3,430,494 | 3/1969 | Dockery | 73/420 |
| 4,108,474 | 8/1978 | Sigrist | 285/12 |
| 4,763,516 | 8/1988 | Greenspan | 73/146.8 |
| 4,932,240 | 6/1990 | Weber | 73/37.9 |
| 4,998,438 | 3/1991 | Martin | 73/146.8 |
| 5,090,237 | 2/1992 | Schrumpf et al. | 73/146.5 |
| 5,386,794 | 2/1995 | Foss et al. | 116/34 R |
| 5,446,948 | 9/1995 | Genero et al. | 24/327 |

*Primary Examiner*—Elizabeth L. Dougherty
*Assistant Examiner*—Joseph L. Felber
*Attorney, Agent, or Firm*—John Heyman

[57] ABSTRACT

A handheld detachable gas pressure gauge shaped like a hypodermic syringe. The gas pressure gauge has an upper pair of side arms mounted perpendicular to an inner cylinder and a lower pair of side arms each below and parallel to each of the upper pair of side arms. A socket in the inner cylinder has pivotal gripping fingers for grasping about a gas pressure valve. Compressing the upper and lower arms together moves the gripping fingers inwardly to grip about the valve which depresses a spring loaded valve core and allows pressure to be measured. Various embodiments use an extendible metering stick, a digital readout, and a dial gauge/Bourdon tube to measure the pressure. Extra attachments include an angled head for improved accessibility to valves located in confined areas, a side adapter socket for allowing gas to be added, a purge button to allow the gauge to release excessive gas pressure and a locking lever for allowing the gas pressure gauge to remain clamped about the valve.

19 Claims, 8 Drawing Sheets

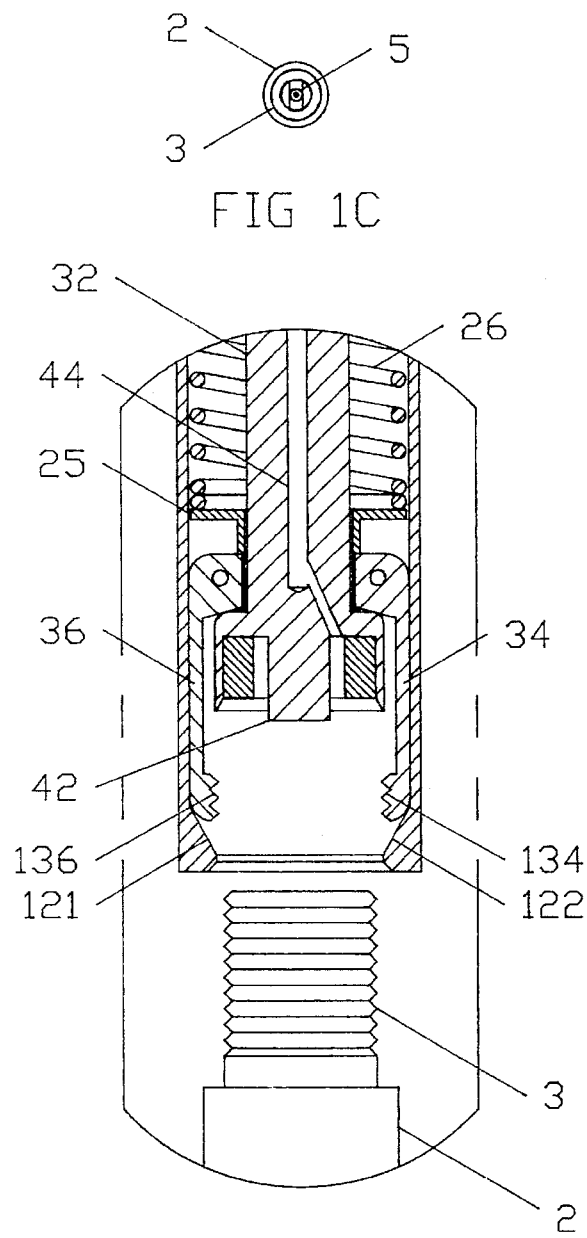
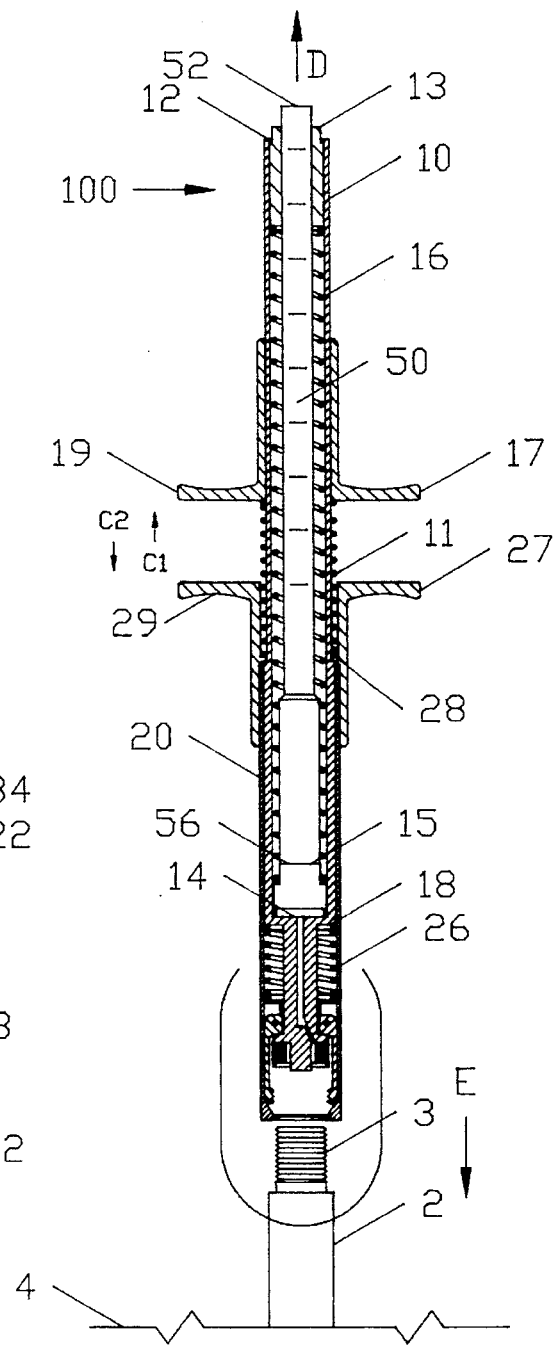
FIG 1C
FIG 1B
FIG 1A

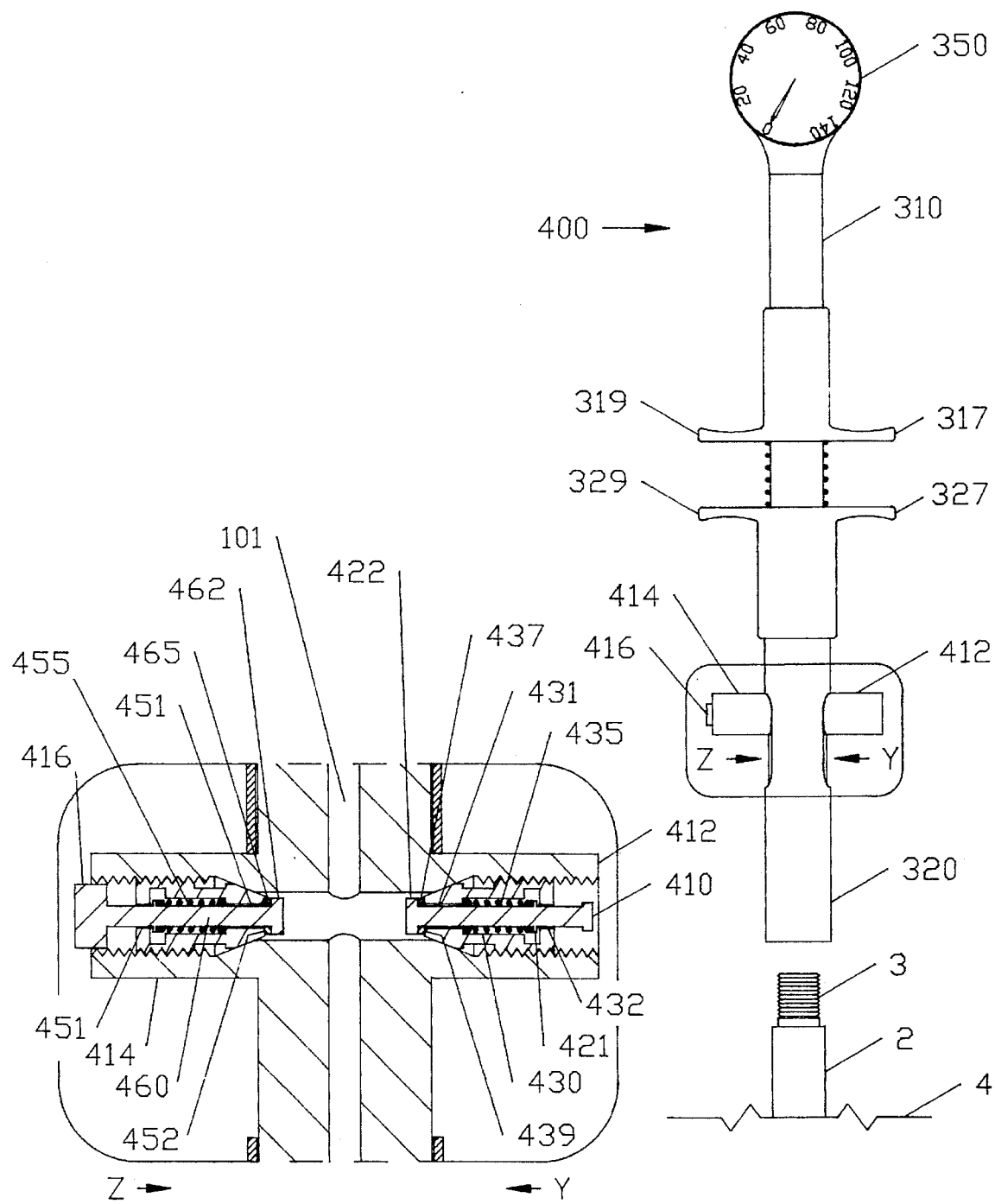

GAS PRESSURE GAUGE CLAMP

This invention relates to air gages, and in particular to a method and apparatus for clamping about a tire valve for reading the compressed air pressure within the tire.

BACKGROUND AND PRIOR ART

Automobile and other types of pneumatic tires need to be properly inflated for optimum tire life, handling performance and gas mileage. Gas pressure Gauges have been widely available for reading tire pressure. Many of the inexpensive pressure gauges include a pen sized device having a socket on one end for fitting about the nipple of a tire and an extendible metering stick on the other end that extends out from the gauge in proportion to the pressure within the tire. A common problem exists in manipulating and orienting the socket of the pressure gauge about the tire nipple. Often, the user must make several attempts to get a readout. The continuous reattempts to get an accurate reading can cause the unnecessary leakage of air from the tire resulting in refilling the tire based on this air leakage. See U.S. Pat. No. 4,763,516 to Greenspan; U.S. Pat. No. 5,090,237 to Schrumpf et al. and U.S. Pat. No. 5,386,794 to Foss et al.

A large gripping clamp has been proposed for air pump hoses but would not work as an air pressure gage. See U.S. Pat. No. 4,108,474 to Sigrist. This large and obtrusive clamp requires constantly holding the nozzle and pump connection together to work. Also the Sigrist clamp must be attached to both the nozzle and the pump separately in order to function properly. Other engaging devices have been proposed but likewise fail for not obviating the above identified problems. See U.S. Pat. No. 3,429,185 to Piper et al; U.S. Pat. No. 3,430,494 to Dockery; U.S. Pat. No. 4,932,240 to Weber; and U.S. Pat. No. 5,446,948 to Genero et al.

SUMMARY OF THE INVENTION

The first objective of the present invention is to provide a portable handheld syringe shaped air gas pressure gauge clamp that quickly clamps on and off the nipple of a tire in order to measure tire pressure.

The second object of this invention is to provide a handheld syringe shaped gas pressure gage clamp for measuring tire pressure having a variably extendible metering stick readout.

The third object of this invention is to provide a handheld syringe shaped gas pressure gage clamp for measuring tire pressure having a digital readout.

The fourth object of this invention is to provide a handheld syringe shaped gas pressure gage clamp for measuring tire pressure having a dial gas pressure gage/Bourdon tube readout.

The fifth object of this invention is to provide a handheld syringe shaped gas pressure gage clamp for measuring tire pressure having an analog dial gage readout.

The sixth object of this invention object of this invention is to provide a handheld syringe shaped gas pressure gage clamp for measuring tire pressure having pressure fill and purge valve.

The seventh object of this invention is to provide a handheld syringe shaped gas pressure gage clamp for measuring tire pressure having a locking mechanism.

A preferred embodiment of the novel longitudinal gas pressure gage having a first cylinder telescoping movable relative to and within a second cylinder which has a socket on a bottom end or receiving a tire pressure valve. The first cylinder has perpendicular extending side arms mounted on opposite sidewalls. The second cylinder has similar perpendicular extending side arms mounted below and parallel to those of the first cylinder. Inside of the socket are pivotal gripping members which grip about the tire pressure valve when the parallel side arms are pulled together. During the clamping action a pressure rod pushes into the tire pressure valve allowing for air pressure within the tire to be measured and indicated by a metering stick, a digital readout or a dial gas pressure gage/Bourdon tube. The air gage can include an angled head for the pressure indicating means to allow users to access valves in confined areas. The novel gas pressure gage can optionally include an adapter socket mounted on the side of the second section beneath the lower side arm for adding pressure to the tire and a purge button which when depressed purges excessive pressure from the tire. Furthermore, the novel gas pressure gage can include a optional lock lever on a side of the second section which temporarily locks the clamping of the tire valve within the socket.

Further objects and advantages of this invention will be apparent from the following detailed description of a presently preferred embodiment which is illustrated schematically in the accompanying drawings.

BRIEF DESCRIPTION OF THE FIGURES

FIG. 1A is a cross-sectional side view of a first preferred embodiment of the novel air gage in a detached position from a tire.

FIG. 1B is an enlarged view of the tire nipple and gripping fingers of the air gage of FIG. 1A.

FIG. 1C is an end view of a tire valve of FIG. 1A along arrow E.

FIG. 4A is an exterior side view of the novel invention of FIG. 3 with a pressure fill valve and pressure purge valve.

FIG. 4B is an enlarged view of the pressure fill valve and pressure purge valve of FIG. 4A.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1E:
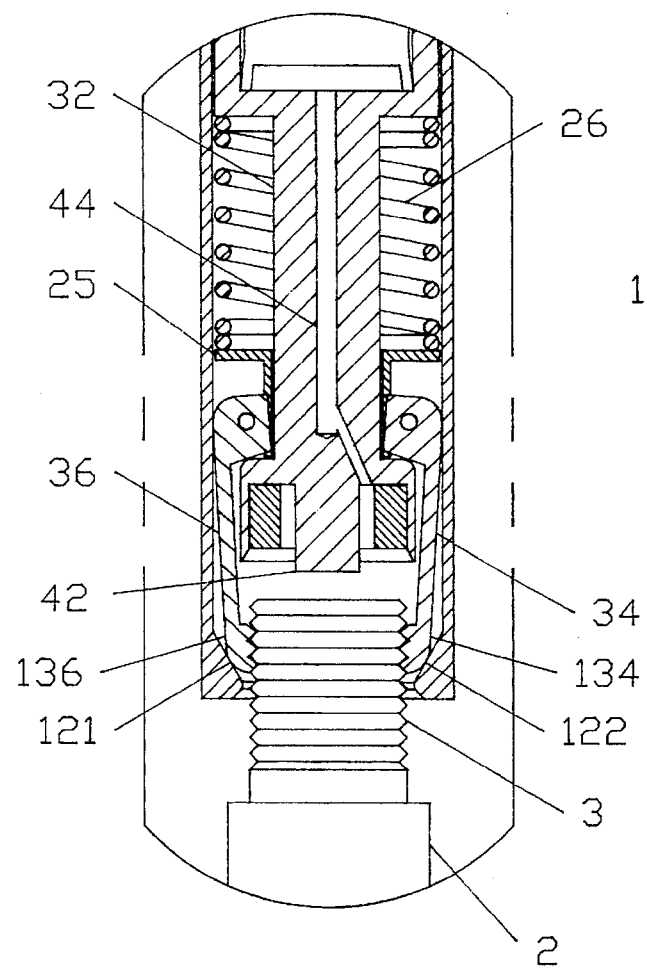
FIG. 1E is an enlarged view of the tire nipple and gripping fingers of FIG. 1D.
Figure 1D:
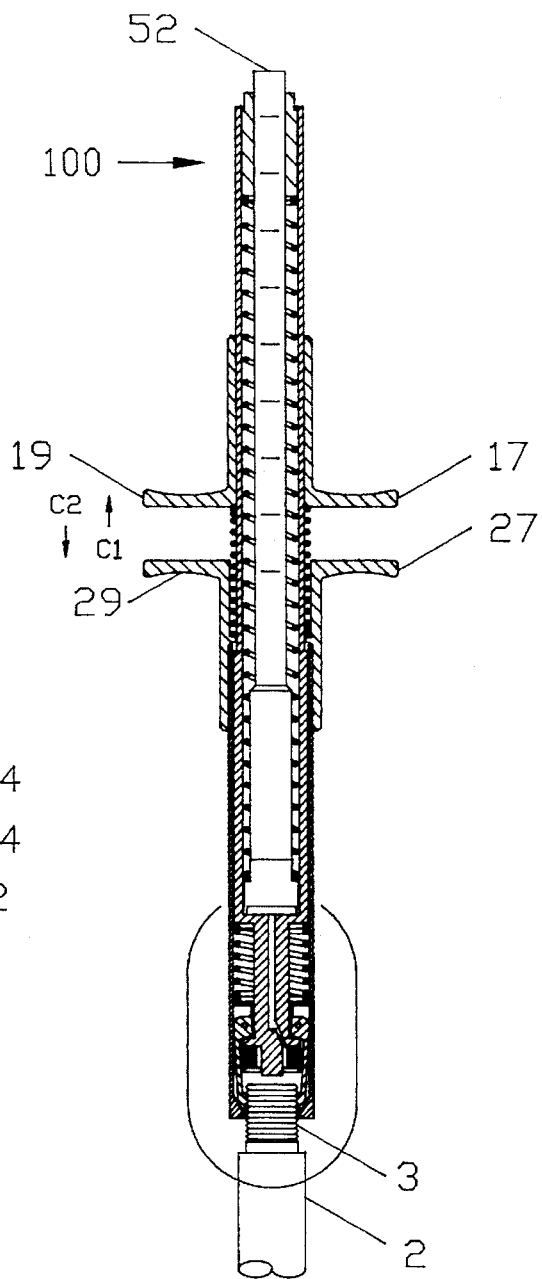
FIG. 1D is a cross-sectional side view of the air gage of FIG. 1A with the gripping fingers grasping about the threads on the tire nipple.
Figures 1F, 1G:
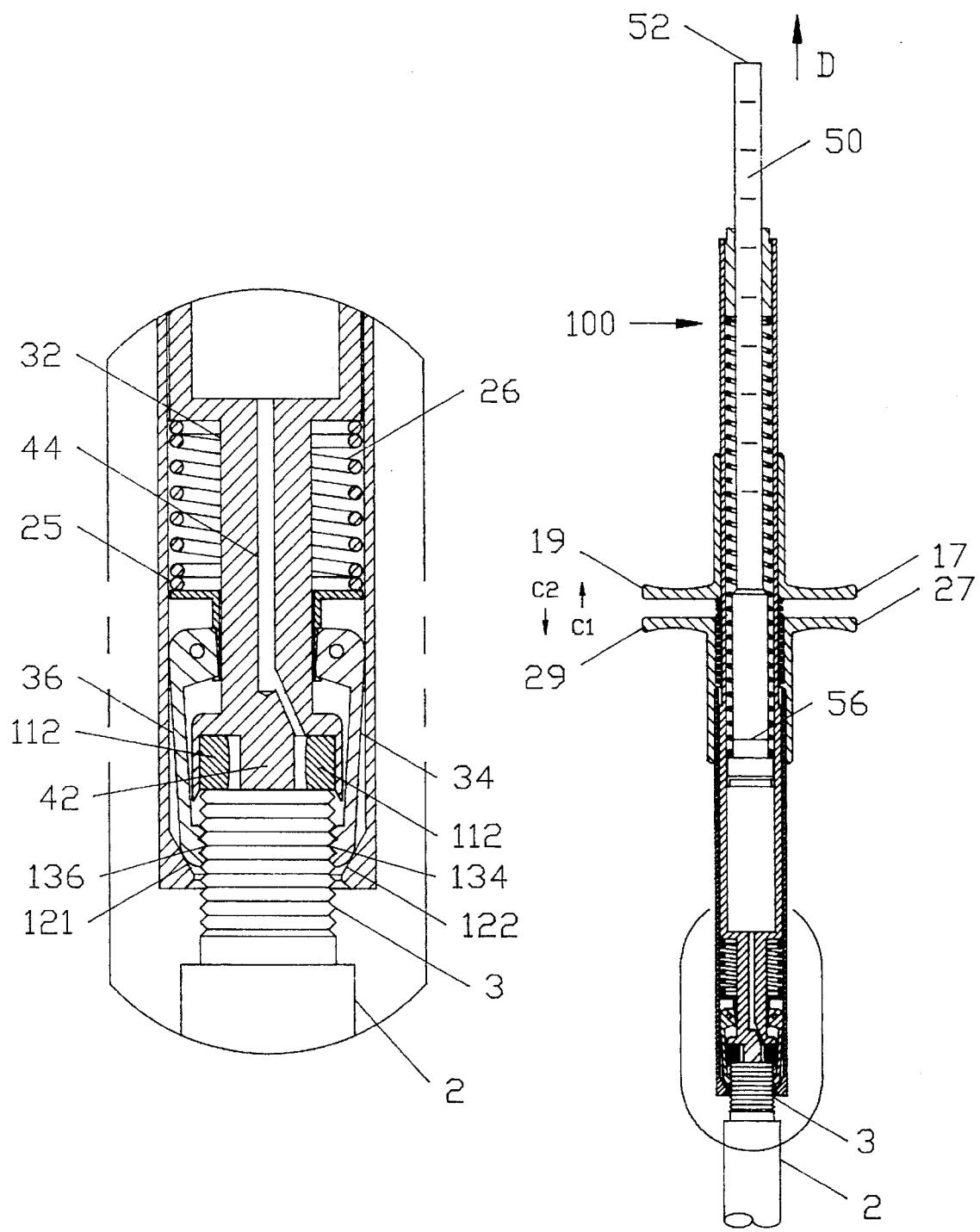
FIG. 1F is a cross-sectional side view of the air gage of FIGS. 1A, 1B, 1D and 1E with the air gage fully attached about the tire nipple and the metering stick in an extended position.
FIG. 1G is an enlarged view of the tire nipple and gripping fingers of FIG. 1F.

FIG. 1A is a cross-sectional side view of a first preferred embodiment 100 of the novel gas pressure gauge in a detached position from a tire. FIG. 1B is an enlarged view of the tire nipple 2, 3 and gripping fingers 34, 36 of the gas pressure gauge 100 of FIG. 1A. FIG. 1C is an end view of a tire valve of FIG. 1A along arrow E having a typical external nipple portion 2, with threaded protruding tube 3 and typical valve tappet 5 thereon that allows air to enter tire 4 when the tappet 5 is depressed. FIG. 1D is a cross-sectional side view of the gas pressure gauge 100 of FIG. 1A with the gripping fingers 34, 36 grasping about the threads 3 on the tire nipple 2. FIG. 1E is an enlarged view of the tire nipple 2, 3 and gripping fingers 34, 36 of FIG. 1D. FIG. 1F is a cross-sectional side view of the gas pressure gauge 100 of FIGS. 1A, 1D with the gas pressure gauge fully attached about the tire nipple 2, 3 and the metering stick 50 in an extended position.

Referring to FIGS. 1A, 1B, 1D, 1E, 1F and 1G, gas pressure gauge clamp 100 includes an inner cylindrical member 10 having first arm 17 and second arm 19 mounted thereon. Arm 17 and arm 19 being affixed opposite to one another and perpendicular to the major axis of member 10. Inside member 10 a pressure receiving chamber is formed by hollow stopper 13 and chamber end 14, stopper 13 being retained by lip 12. Within said pressure receiving chamber are piston 15, first spring 16 and meter stick 50, spring 16 being assembled around meter stick 50 and between stopper 13 and piston 15. An outer cylindrical member 20 includes first arm 27 and second arm 29 mounted thereon. Arm 27 and arm 29 being affixed below like arms 17 and 19 and perpendicular to the major axis of member 20. Located on the external surface of inner member 10 and between outer member 20 is shoulder 18, bushing 25, second spring 26 and slide portion 32. Bushing 25 being assembled about slide portion 32 and opposite shoulder 18, spring 26 being retained between said shoulder 18 and said bushing 25.

In operation a user holds gauge 100 similar to a hypodermic syringe where a first human finger and second human finger (not shown) can be positioned to the underside of extended arms 27, 29 and a thumb can be positioned on top of either extendible arms 17, 19. See FIGS. 1A, 1B, 1D, 1E, 1F, 1G. Pulling arms 27, 29 upward in the direction of arrow C1 while simultaneously pushing arms 17, 19 downward in the direction of arrow C2 compresses spring 11 which is positioned between arms 17, 19 and interior channel edge 28 between arms 27, 29. This action further compresses spring 26 pushing finger tips 134, 136 down in the direction of arrow E where interior angled wedge areas 121, 122 of tube 20 causes finger tips 134, 136 of fingers 34, 36 to move inward and grasp about threads 3 of tire nipple 2 (shown more clearly in FIGS. 1D, 1E). Continuing to press forcibly together arms 17, 19, 27 and 29 compresses resilient gasket 112 to form a seal between the tire nipple 2, 3 and the interior of air gage 100, while forcing protruding end 42 to contact tire valve tappet 5. Next, air from tire 4 passes through passageway 44 pushing enlarged meter stick end 56, causing end 52 of meter stick 50 to move in the direction of arrow D (shown more clearly in FIGS. 1F, 1G).

Figure 2:
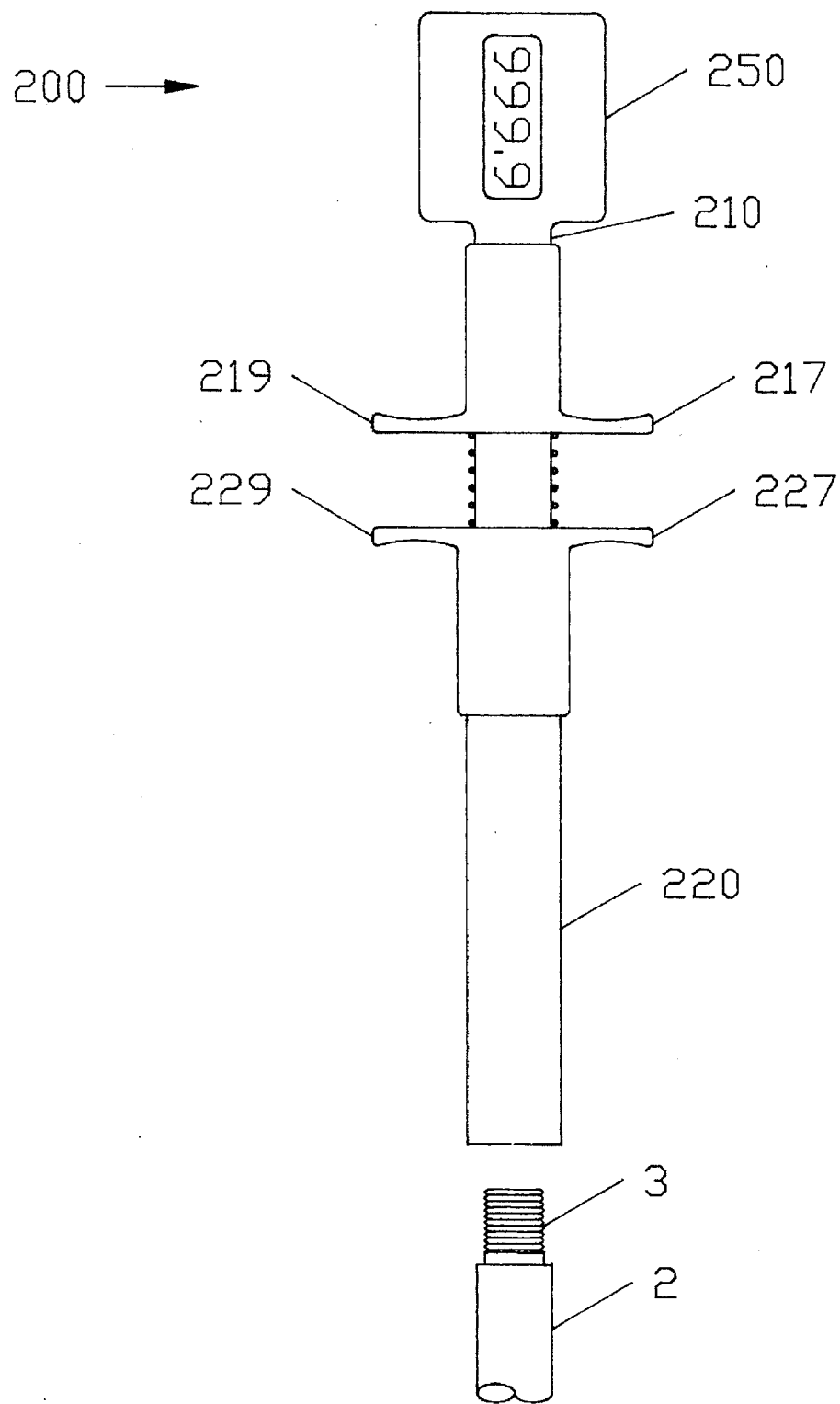
FIG. 2 is an exterior side view of novel invention of FIGS. 1A, 1B, 1D, 1E, 1F, 1G with a digital readout indicator.

FIG. 2 is an exterior side view of novel invention 200 of FIGS. 1A–1B with a digital readout indicator 250. An off-the-shelf digital readout indicator can be a digital pressure gauge having an LCD display such as Model No. MS-41B of the Measurement Specialties Co. of Fairfield, N.J. Components 210, 217, 219, 220, 227, 229 correspond to like components 10, 17, 19, 20, 27, 29 of FIGS. 1A–1B, and with identical interior clamping components.

Figure 3:
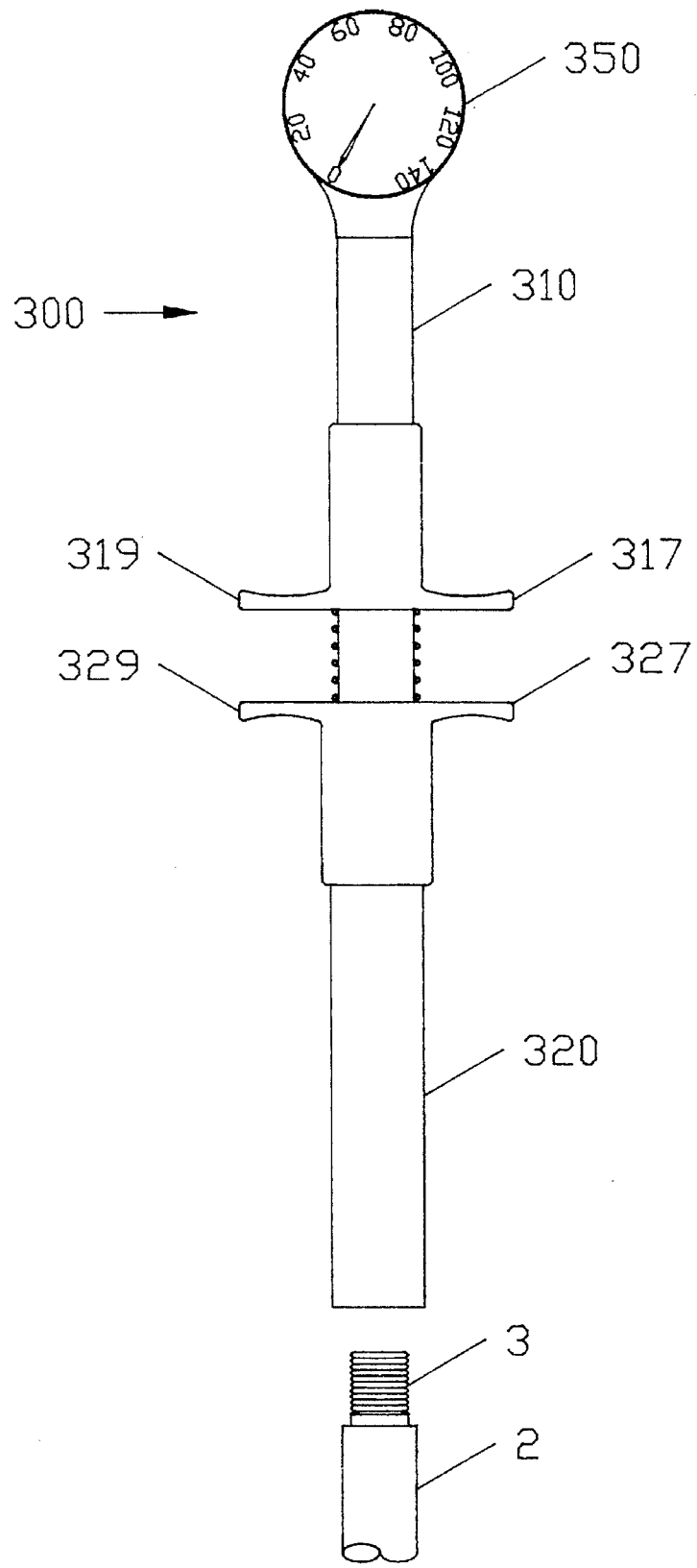
FIG. 3 is an exterior side view of the novel invention of FIGS. 1A, 1B, 1D, 1E, 1F, 1G with a dial gage/Bourdon tube readout indicator.

FIG. 3 is an exterior side view of the novel invention 300 of FIGS. 1A–1B with a dial gage/Bourdon tube readout indicator 350. An off-the-shelf dial gage/Bourdon tube can be Model No. 12MST manufactured by Ashcroft Gages, a division of Dresser Industries of Stratford, Conn. Components 310, 317, 319, 320, 327, 329 correspond to like components 10, 17, 19, 20, 27, 29 of FIG. 1A.

FIG. 4A is an exterior side view of the novel invention 400 of FIG. 3 with a pressure fill valve 412 and pressure purge valve 414. FIG. 4B is an enlarged cross-sectional view of pressure fill valve 412 and pressure purge valve 414 of FIG. 4A. Referring to FIGS. 4A–4B, a conventional external air supply line (not shown) can temporarily attach to pressure fill opening 412. The conventional air supply lines have an internal type protruding member which when attached would depress tapet vavle 410 within an interior chamber 430, wherein side ledge 421 of tappet valve 410 compresses spring 435 pushing valve seat 422 inward in the direction of arrow Y separating compliant seal 437 from interior wall ledge 439 and allowing a passageway 431, 432 formed on the side of valve 410 to allow air from the external supply to enter interior chamber 101 of air gage 400 to fill an attached tire 4. Spring 435 allows for valve 410 to return to its initial rest position.

The purge valve button will now be described in reference to FIGS. 4A–4B. A user can depress purge valve button 416 in the direction of arrow Z pushing valve 460 inward compressing spring 455 causing valve seat 462 to separate from compliant seal 465 and interior wall 452 purging air from tire 4 to pass through passageway 101 and out the sidewall passageway 451. Spring 455 allows purge button 416 to return to its initial rest position.

Figure 5B:
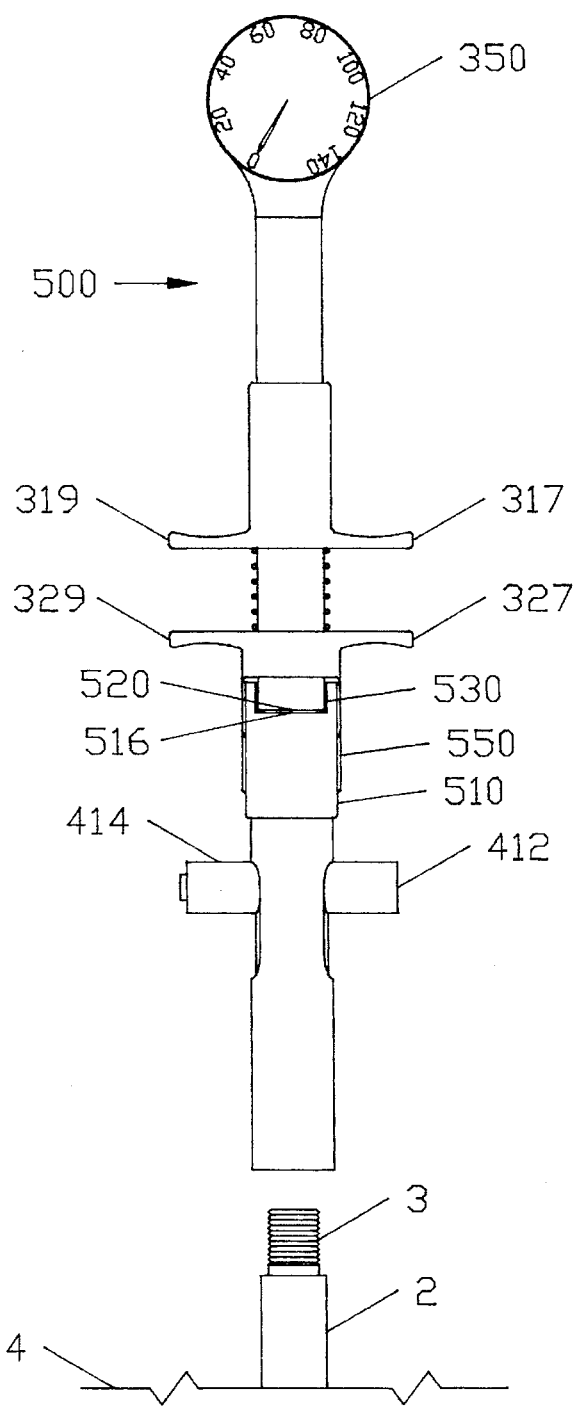
FIG. 5B is a frontal exterior view of FIG. 5A along arrow R.
Figure 5A:
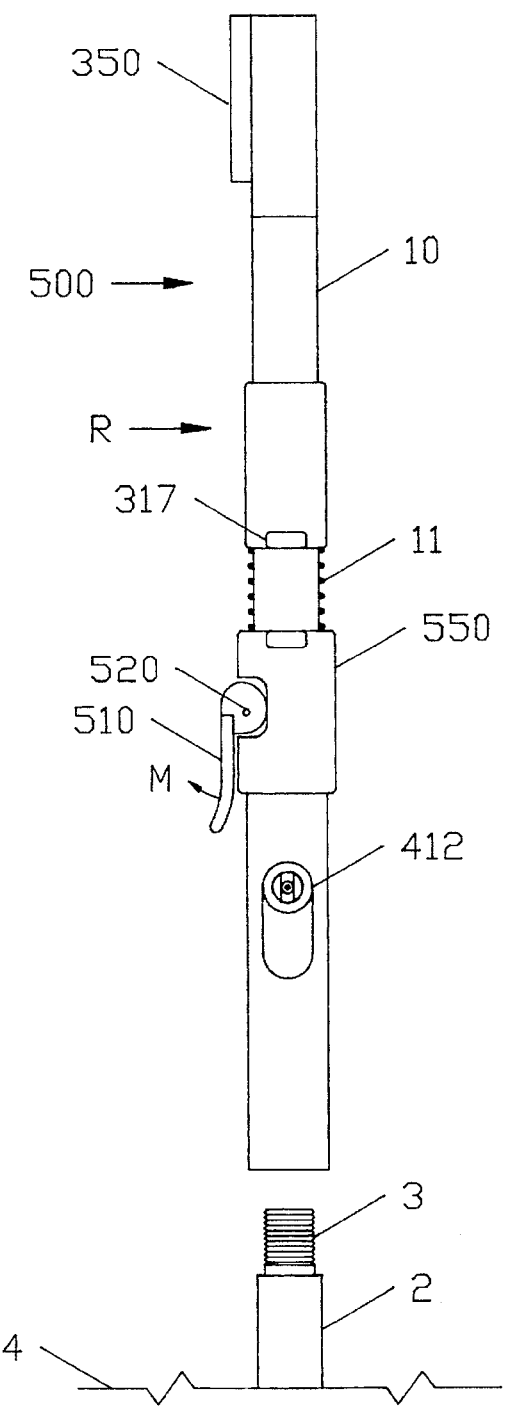
FIG. 5A is an exterior side view of FIG. 4 with a lock lever.
Figure 5C:
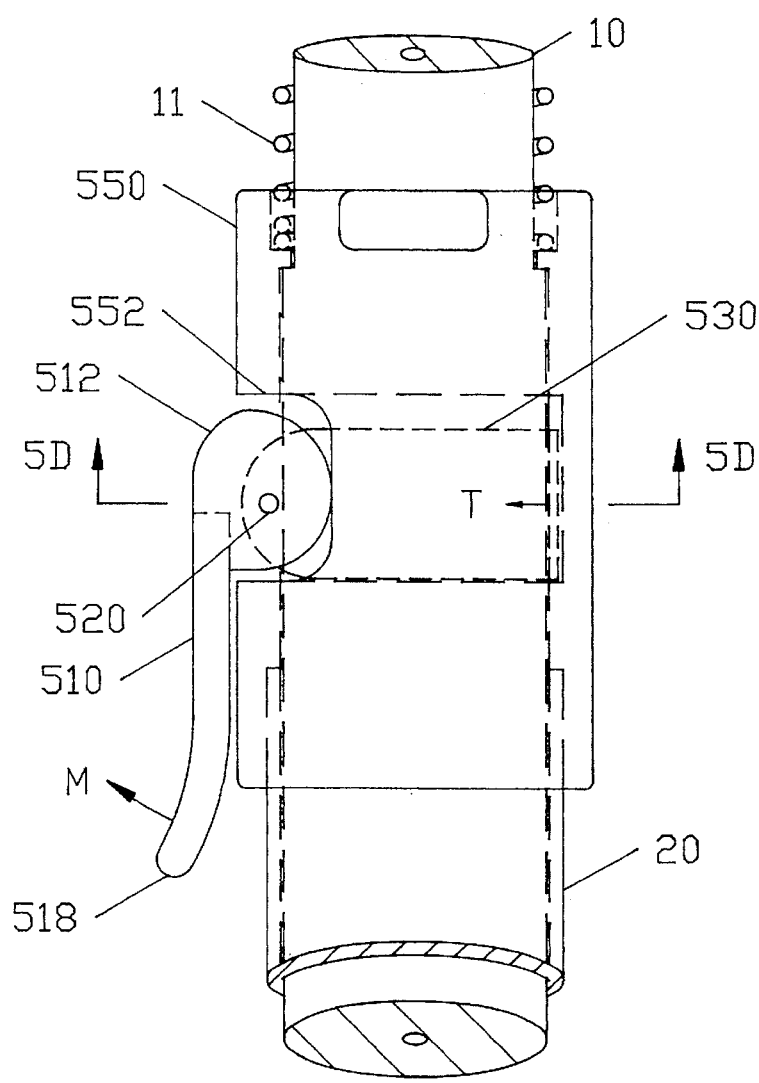
FIG. 5C is a enlarged side view of the lock button of FIG. 5A.
Figure 5D:
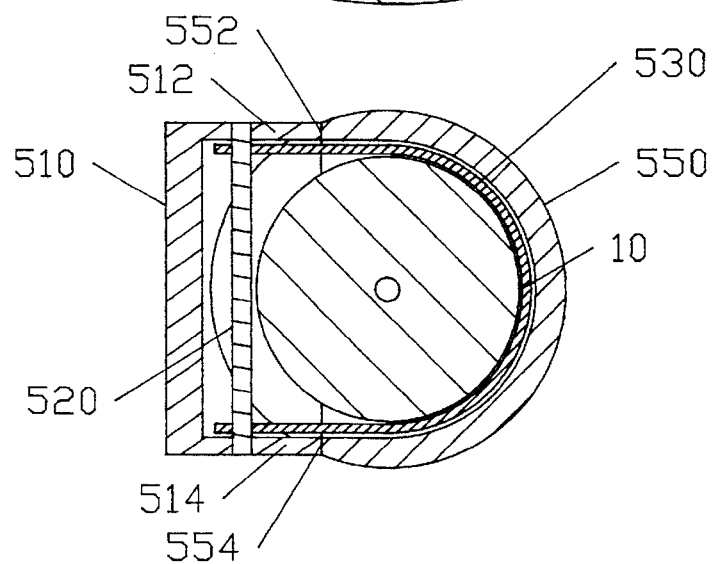
FIG. 5D is a cross-sectional view of the lock button of FIG. 5C along arrow 5D—5D.

FIG. 5A is an exterior side view of an alternative embodiment 500 of FIG. 4 with a lock lever 510. FIG. 5B is a front exterior view of FIG. 5A along arrow R. FIG. 5C is a enlarged side view of the lock lever of FIG. 5A. FIG. 5D is a cross-sectional view if the lock mechanism along arrow 5D—5D. Referring to FIGS. 5A–5D, an external outer cylindrical casing 550 is fixably attached to lower cylinder 20. A manually actuated lever 510 has a curved lower portion 518 which is movable in the direction of arrow M pivoting oblong shaped cams 512, 514 about a pin 520. The top of lever 510 has a notched portion 516 between cams 512, 514 (more clearly shown in FIG. 5B. Referring to FIGS. 5A≧5D, the opposite ends of the pin 520 pass through the ends of flexible strap 530, said flexible strap 530 is wrapped about inner cylinder 10. Rotating lever 510 in the direction of arrow M causes oblong shaped cams 512, 514 to rotate in the cut-out curved sides 552, 554 of outer casing 550 resulting in pulling strap 530 in the direction of arrow T against inner cylinder 10 and locking the current position of inner cylinder 10 relative to outer cylinder 20. The locking mechanism 500 allows for the air gage clamp to be attached to the tire nipple 2 so that air can be purged or filled at will through pressure purge valve 414 or pressure fill valve 412, respectively.

The components formed in the novel invention can include injection-molded plastics, aluminum, stainless steel, brass, and combinations thereof.

Although the preferred embodiments describe longitudinal cylindrical air pressure gage body shapes, the invention can have an angled clamp body to better allow a readout of the gage and improved accessibility to valves affixed in confined areas. Curved angled readouts can also be included for the digital readout 200 of FIG. 2 and the Bourdon tube readout of FIG. 3.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of clamping a gas pressure gauge having extendible fingers onto a valve stem to measure pressure, comprising the steps of:
   (a) providing a tubular means formed with outer and inner movable telescoping portions normally biased partially apart;
   (b) positioning a socket of said outer portion about a valve stem, said socket having a reduced diameter tip;
   (c) compressing said outer portion of the tubular means and said inner portion of the tubular means together to cause said extendible fingers formed as part of said inner portion to engage said valve stem;
   (d) holding said extendible fingers of said inner portion to the valve stem by said reduced diameter tip on said socket of said outer portion to form a seal with said valve stem; and
   (e) measuring pressure by a display means.

2. The method of clamping the gas pressure gauge of claim 1, wherein the compressing step (c) includes providing: a first syringe like upper side arm extending from the inner portion of tubular means; and a first syringe like lower side arm extending from the outer portion of the tubular means, the first upper side arm and the first lower side arm being opposite to one another.

3. The method of clamping the gas pressure gauge of claim 2, wherein the compressing step (c) further includes providing: a second upper side arm extending from the inner portion of the gas pressure gage; and a second lower side arm extending from the outer portion of the tubular means, the second upper side arm and the second lower side arm being opposite to one another.

4. The method of clamping the gas pressure gauge of claim 1, wherein the holding step (d) includes: employing a threaded means to mechanically engage about the circumference of a valve stem.

5. The method of clamping the gas pressure gauge of claim 1, further including the steps of:
   (f) adding pressure through a first side adapter socket on the inner portion of the gas pressure gauge; and
   (g) purging excessive pressure through a second side adapter socket on said inner portion.

6. The method of clamping the gas pressure gauge of claim 5, further including the step of:
   (h) adding a means to lock of the valve stem within the socket.

7. The method of clamping the gas pressure gauge of claim 1, wherein the measuring step (e) includes: providing an extendible metering stick to the measure the pressure.

8. The method of clamping the gas pressure gauge of claim 1, wherein the measuring step (e) includes: employing a digital readout.

9. The method of clamping the gas pressure gauge of claim 1, wherein the measuring step (e) includes: employing a dial gauge/Bourdon tube.

10. A handheld gas pressure gauge for temporary clamping on and off of a gas pressure valve, the gas pressure gauge comprising:
    a longitudinal tube means having an inner section movable telescopically relative to an outer section that are normally biased partially apart, the outer section having a socket at one end for receiving a pressure valve;
    a first syringe like upper arm mounted to a side of the inner section; a first syringe like lower arm mounted to a side of the outer section, the first upper arm located substantially above the first lower arm; gripping means formed as part of said socket for providing a grip circumferentially about the pressure valve when said upper and said lower arms on said inner and outer sections are compressed together; and pressure measuring means adjacent to the inner section, to enable gas pressure to be indicated on the measuring means.

11. The handheld gas pressure gauge of claim 10, wherein the inner section and the outer section include:
    a first cylinder having a lower portion thereof being telescopically received within a top opening of a second cylinder.

12. The handheld gas pressure gauge of claim 10, further comprising:
    a second syringe like upper arm mounted to a side of the inner section opposite to the first upper arm:
    and a second lower syringe like arm mounted to a side of the outer section opposite to the first lower arm, the second upper arm being opposite the second lower arm.

13. The handheld gas pressure gauge of claim 10, further comprising:
    a first adapter socket means mounted on the side of the inner section beneath a lower arm for adding gas to said pressure valve.

14. The handheld gas pressure gauge of claim 13, further comprising: a second adapter socket means mounted on the side of the inner section beneath a second lower arm for allowing excessive pressure to be purged.

15. The handheld gas pressure gauge of claim 14, further comprising a purge button as part of said second adapter socket means so that when depressed releases excessive pressure.

16. The handheld gas pressure gauge of claim 10, further comprising: a lock means on a side of the outer section which when engaged, maintains the clamping of the gas pressure gauge onto the valve.

17. The handheld gas pressure gauge of claim 10, wherein the measuring means includes: an extendible metering stick.

18. The handheld gas pressure gauge of claim 10, wherein the measuring means includes: a digital readout.

19. The handheld gas pressure gauge of claim 11, wherein the measuring means includes: a dial gauge/Bourdon tube.

* * * * *